United States Patent
Lee et al.

(10) Patent No.: US 9,369,696 B2
(45) Date of Patent: Jun. 14, 2016

(54) IMAGE PROCESSING APPARATUS AND METHOD

(75) Inventors: Seung Kyu Lee, Seoul (KR); Hwa Sup Lim, Hwaseong-si (KR); Kee Chang Lee, Yongin-si (KR); Ouk Choi, Yongin-s (KR)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 1361 days.

(21) Appl. No.: 13/030,550

(22) Filed: Feb. 18, 2011

(65) Prior Publication Data

US 2012/0026296 A1 Feb. 2, 2012

(30) Foreign Application Priority Data

Jul. 29, 2010 (KR) .................. 10-2010-0073643

(51) Int. Cl.
*H04N 13/02* (2006.01)
*G06T 7/00* (2006.01)

(52) U.S. Cl.
CPC .............. *H04N 13/025* (2013.01); *G06T 7/002* (2013.01); *G06T 7/0071* (2013.01); *H04N 13/0246* (2013.01); *G06T 2207/10024* (2013.01); *G06T 2207/10028* (2013.01); *G06T 2207/30244* (2013.01)

(58) Field of Classification Search
CPC .......... H04N 13/00; H04N 13/02; G06K 9/00
USPC .................... 348/47, 208.4; 707/205; 726/29; 382/284
See application file for complete search history.

(56) References Cited

U.S. PATENT DOCUMENTS

| | | | | |
|---|---|---|---|---|
| 6,516,099 B1* | 2/2003 | Davison | ............... | G06T 7/0028 345/419 |
| 2002/0095276 A1* | 7/2002 | Rong | ..................... | G06T 17/00 703/2 |
| 2003/0202691 A1* | 10/2003 | Beardsley | ............... | G06T 7/002 382/154 |
| 2007/0081714 A1* | 4/2007 | Wallack | ................. | G06K 9/209 382/152 |
| 2008/0215644 A1* | 9/2008 | Beric | ........................ | G06T 1/60 |
| 2008/0243416 A1* | 10/2008 | Bryll | .................... | G01B 21/042 702/95 |
| 2008/0291282 A1* | 11/2008 | Fitzgibbon | ............. | G06K 9/209 348/187 |
| 2011/0025827 A1* | 2/2011 | Shpunt | .................. | G06T 7/0057 348/47 |

(Continued)

FOREIGN PATENT DOCUMENTS

| | | |
|---|---|---|
| KR | 2001-0033919 | 4/2001 |
| KR | 2005-0058085 A | 6/2005 |

(Continued)

OTHER PUBLICATIONS

Seo. "A study on a three-dimensional reconstruction and motion capture using multiple view images." *d Collection, CAU*.

(Continued)

*Primary Examiner* — Richard Torrente
*Assistant Examiner* — Irfan Habib
(74) *Attorney, Agent, or Firm* — Harness, Dickey & Pierce, P.L.C.

(57) ABSTRACT

A first calculator of an image processing apparatus may trace a view transform vector between color images of different frames. A second calculator may trace a view transform vector between depth images of different frames. In this example, a third calculator may calculate a view transform vector between the color camera and the depth camera using the view transform vector between the color images and the view transform vector between the depth images.

20 Claims, 8 Drawing Sheets

(56) References Cited

U.S. PATENT DOCUMENTS

| | | | |
|---|---|---|---|
| 2011/0085049 A1* | 4/2011 | Dolgin | H04N 5/23248 348/208.4 |
| 2011/0283366 A1* | 11/2011 | Kwon | G06F 21/54 726/29 |

FOREIGN PATENT DOCUMENTS

| KR | 10-2007-0064371 | 6/2007 |
|---|---|---|
| KR | 10-2007-0107542 | 11/2007 |
| KR | 10-2008-0001095 | 1/2008 |
| KR | 10-2009-0065198 | 6/2009 |
| KR | 10-2009-0075399 | 7/2009 |
| KR | 10-2009-0102492 | 9/2009 |

OTHER PUBLICATIONS

Korean Office Action dated Feb. 22, 2016 for corresponding KR Application No. 10-2010-0073643.

* cited by examiner

IMAGE PROCESSING APPARATUS AND METHOD

CROSS-REFERENCE TO RELATED APPLICATIONS

This application claims the priority benefit of Korean Patent Application No. 10-2010-0073643, filed on Jul. 29, 2010, in the Korean Intellectual Property Office, the disclosure of which is incorporated herein by reference.

BACKGROUND

1. Field

Example embodiments relate to a calibration between heterogeneous cameras constituting a single set, and more particularly, to a real-time online calibration process between a color camera and a depth camera having rigid relative positions.

2. Description of the Related Art

In a system configured to obtain three-dimensional (3D) information using a camera set including at least two heterogeneous cameras, for example, a set of a color camera and a depth camera, calibration needs to be performed between heterogeneous cameras for matching of information obtained from the heterogeneous cameras.

Hereinafter, the calibration between the heterogeneous cameras may be understood as calculating a view transform vector between the color camera and the depth camera.

The view transform vector includes a view translation vector including information of a geometrical difference between the color camera and the depth camera, and a view rotation vector between the color camera and the depth camera.

In the conventional art, to perform calibration between a plurality of cameras positioned at different spatial positions, geometrical difference information between cameras has been calculated by extracting corresponding points using a known pattern and by using the extracted corresponding points.

To obtain accurate 3D information with respect to a 3D object, different types of cameras, for example, as a color camera, a depth camera, and the like are being used as a set. Even in this case, the calibration between cameras is used for obtaining a high precision image.

SUMMARY

The foregoing and/or other aspects are achieved by providing an image processing apparatus, including: a first calculator to calculate a view transform vector of a color camera between a first frame and a second frame by comparing corresponding points between a color image of the first frame and a color image of the second frame; a second calculator to calculate a view transform vector of a depth camera between the first frame and the second frame by comparing corresponding points between a depth image of the first frame and a depth image of the second frame; and a third calculator to calculate a view transform vector between the color camera and the depth camera using the view transform vector of the color camera and the view transform vector of the depth camera.

The first calculator may extract a plurality of feature points from each of the color image of the first frame and the color image of the second, frame, may determine the corresponding points between the color image of the first frame and the color image of the second frame among the extracted plurality of feature points, and may calculate the view transform vector of the color camera between the first frame and the second frame using a displacement between the corresponding points.

The first calculator may calculate the view transform vector of the color camera between the first frame and the second frame using a structure form motion (SFM) process.

The second calculator may extract a plurality of feature points from each of the depth image of the first frame and the depth image of the second image, may determine the corresponding points between the depth image of the first frame and the depth image of the second frame among the extracted plurality of feature points, and may calculate the view transform vector of the depth camera between the first frame and the second frame using a displacement between the corresponding points.

The second calculator may calculate the view transform vector of the depth camera between the first frame and the second frame using at least one of a depth point cloud matching process and a three-dimensional (3D) feature point correspondence process.

The first calculator may calculate the view transform vector of the color camera between the first frame and the second frame by comparing the corresponding points between the color image of the first frame and the color image of the second frame, and may calculate a view transform vector of the color camera between the second frame and a third frame by comparing corresponding points between the color image of the second frame and a color image of the third frame.

The second calculator may calculate the view transform vector of the depth camera between the first frame and the second frame by comparing the corresponding points between the depth image of the first frame and the depth image of the second frame, and may calculate a view transform vector of the depth camera between the second frame and the third frame by comparing corresponding points between the depth image of the second frame and a depth image of the third frame.

The third calculator may calculate the view transform vector between the color camera and the depth camera using the view transform vector of the color camera between the first frame and the second frame, the view transform vector of the color camera between the second frame and the third frame, the view transform vector of the depth camera between the first frame and the second frame, and the view transform vector of the depth camera between the second frame and the third frame.

The third calculator may determine an appropriateness of the calculated view transform vector between the color camera and the depth camera using statistics of previously calculated view transform vectors.

The foregoing and/or other aspects are achieved by providing an image processing method, including: calculating a view transform vector of a color camera between a first frame and a second frame by comparing corresponding points between a color image of the first frame and a color image of the second frame; calculating a view transform vector of a depth camera between the first frame and the second frame by comparing corresponding points between a depth image of the first frame and a depth image of the second frame; and calculating a view transform vector between the color camera and the depth camera using the view transform vector of the color camera and the view transform vector of the depth camera.

The example embodiments may include an image processing apparatus and method that may perform calibration between heterogeneous cameras in real time.

The example embodiments may also include an image processing apparatus and method that may accurately measure a motion vector (hereinafter, "view transform vector") between frames regardless of a resolution difference between a two-dimensional (2D) color image and a three-dimensional (3D) depth image.

The example embodiments may also include an image processing apparatus and method that may perform accurate calibration by solving camera drift even though a view translation or a view rotation between heterogeneous cameras varies over time.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
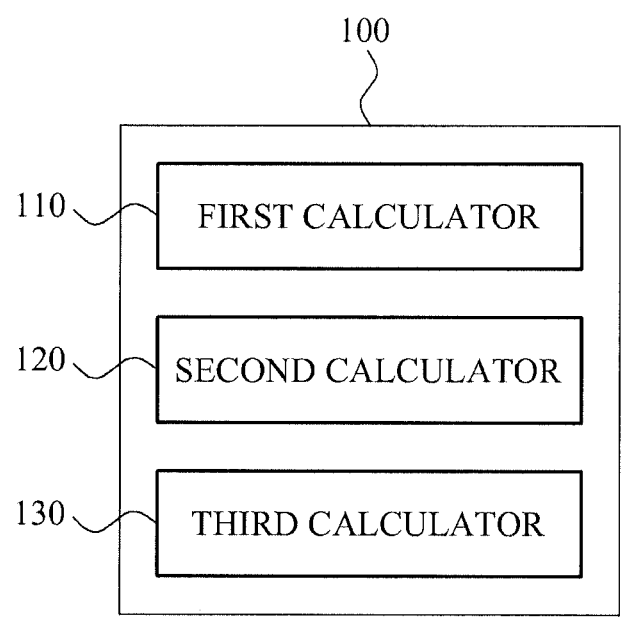
FIG. 1 illustrates an image processing apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an image processing apparatus 100 according to example embodiments.

When three-dimensional (3D) information is obtained by combining color information and depth information of a 3D object using a single set, for example, of a color camera and a depth camera, the color camera and the depth camera may face different directions at different positions.

In this example, matching of a color image acquired from the color camera and a depth image acquired from the depth camera is used to combine the color image and the depth image.

For the above matching, geometrical difference information between the color camera and the depth camera may be expressed by a view translation vector of the color camera and the depth camera. A difference between a direction faced by the color camera and a direction faced by the depth camera is expressed by a view rotation vector.

Hereinafter, calibration information to correct the geometrical difference between the color camera and the depth camera is expressed by the view translation vector. Calibration information to correct the direction difference between the color camera and the depth camera is expressed by the view rotation vector.

Calibration information including the view translation vector and the view rotation vector is expressed by a view transform vector.

The image processing apparatus 100 may receive color images of a plurality of frames acquired by the color camera, and depth images corresponding to the plurality of frames.

In this example, a first calculator 110 of the image processing apparatus 100 may extract a plurality of feature points from each of a color image of a first frame and a color image of a second frame.

The first calculator 110 may select, from a plurality of feature points extracted from the second frame, corresponding points with respect to at least one portion of a plurality of feature points extracted from the first frame.

In this example, the first calculator 110 may calculate a view transform vector C between a color camera view in the first frame and a color camera view in the second frame using a displacement between the selected corresponding points.

The first calculator 110 may calculate the view transform vector C of the color camera between the first frame and the second frame using a structure form motion (SFM) process.

A second calculator 120 may extract a plurality of feature points from each of a depth image of the first frame and a depth image of the second frame.

The second calculator 120 may select, from a plurality of feature points extracted from the second frame, corresponding points with respect to at least one portion of a plurality of feature points extracted from the first frame.

In this example, the second calculator 120 may calculate a view transform vector D between a depth camera view in the first frame and a depth camera view in the second frame using a displacement between the selected corresponding points.

The second calculator 120 may calculate the view transform vector D of the depth camera between the first frame and the second frame using a 3D feature point correspondence process.

The second calculator 120 may calculate the view transform vector D of the depth camera between the first frame and the second frame using a depth point cloud matching process.

A third calculator 130 may calculate a view transform vector X between the depth camera and the color camera in the first frame and/or the second frame using the view transform vector C between the color camera view in the first frame and the color camera view in the second frame, and the view transform vector D of the depth camera between the first frame and the second frame.

The calculated view transform vector X between the color camera and the depth camera may represent calibration information of the color camera and the depth camera. 3D information of an object may be obtained by matching the color image and the depth image using the view transform vector X.

Hereinafter, an operation of the image processing apparatus 100 will be further described with reference to FIG. 2.

Figure 2:
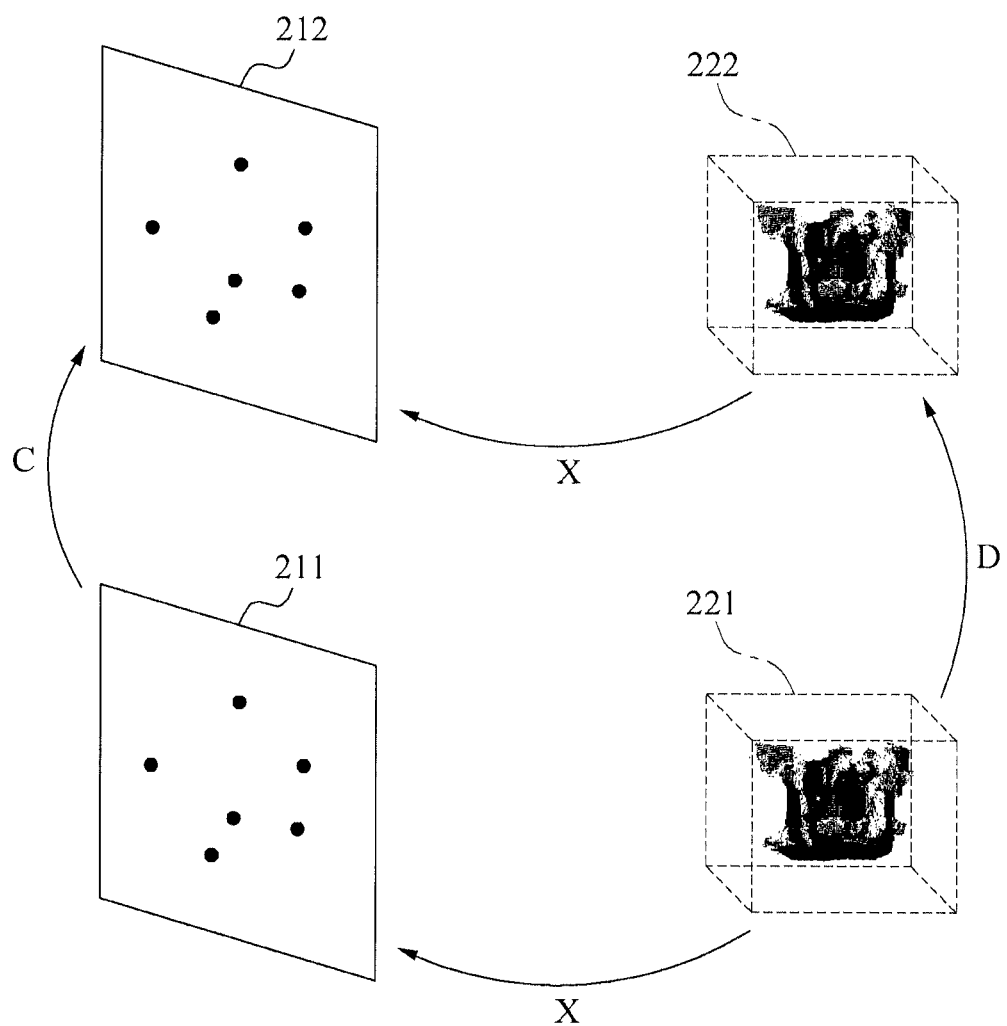
FIG. 2 illustrates a diagram to describe an image processing method according to example embodiments.

FIG. 2 illustrates a diagram to describe an image processing method according to example embodiments.

A color image 211 of a first frame and a color image 212 of a second frame may be acquired from a color camera. A depth image 221 of the first frame and a depth image 222 of the second frame may be acquired from a depth camera.

When corresponding points between feature points of the color image 211 of the first frame and feature points of the color image 212 of the second frame are selected, the first calculator 110 of the first image processing apparatus 100 may calculate a view transform vector C representing a transformation between geometry information of the corresponding points.

In this example, the view transform vector C may be expressed by Equation 1.

$$C = \begin{bmatrix} R_c & t_c \\ 0 & 1 \end{bmatrix} \quad \text{[Equation 1]}$$

In Equation 1, $R_c$ corresponds to a view rotation vector of the color camera between the first frame and the second frame, and $t_c$ corresponds to a view translation vector of the color camera between the first frame and the second frame.

When corresponding points between feature points of the depth image 221 of the first frame and feature points of the depth image 222 of the second frame are selected, the second calculator 120 of the first image processing apparatus 100 may calculate a view transform vector D representing a transformation between geometry information of the corresponding points.

The second calculator 120 may calculate the view transform vector D using a depth point cloud matching process. Hereinafter, even though not particularly described, a method of calculating the view transform vector D is not limited to the example embodiments.

The view transform vector D may be expressed by Equation 2.

$$D = \begin{bmatrix} R_d & t_d \\ 0 & 1 \end{bmatrix} \quad \text{[Equation 2]}$$

In Equation 2, $R_d$ corresponds to a view rotation vector of the depth camera between the first frame and the second frame, and $t_d$ corresponds to a view translation vector of the depth camera between the first frame and the second frame.

When the view transform vector C of the color camera between the first frame and the second frame and the view transform vector D of the depth camera between the first frame and the second frame are calculated, the third calculator 130 may calculate a view transform vector X between the color camera and the depth camera.

In this example, the view transform vector X may be expressed by Equation 3.

$$X = \begin{bmatrix} R_x & t_x \\ 0 & 1 \end{bmatrix} \quad \text{[Equation 3]}$$

In Equation 3, $R_x$ corresponds to a view rotation vector of the depth camera between the first frame and the second frame, and $t_x$ corresponds to a view translation vector of the depth camera between the first frame and the second frame.

In this example, the third calculator 130 may calculate the view transform vector X according to Equation 4.

$$CX = XD \quad \text{[Equation 4]}$$

In the case of the view transform vector C, feature points within a color image have only information associated with two-dimensional (2D) coordinates. Accordingly, since a scale factor of the color camera cannot be acquired using only color images of two frames, only scaled transformation may be obtained.

In the case of the depth camera, distance information between the depth camera and the object is known and thus, absolute transformation may be obtained.

Accordingly, $t_c$ that is a view translation vector portion of the color camera within the view transform vector C of the color camera may be rewritten as a norm of a unit vector and a translation vector as given by Equation 5.

$$t_c = \lambda_c \hat{t}_c \quad \text{[Equation 5]}$$

In this example, known values calculated by the first calculator 110 and the second calculator 120 correspond to $R_c$, $R_d$, $\hat{t}_c$, and $t_d$.

Unknown values correspond to $t_c$, $\lambda_c$, $R_x$, and $t_x$.

Also, $t_x$ may be rewritten as a norm of a unit vector and a translation vector as given by Equation 6.

$$t_x = \lambda_x \hat{t}_x \quad \text{[Equation 6]}$$

When the above Equation 5 and Equation 6 are substituted for Equation 4, Equation 7 may be obtained.

$$\begin{bmatrix} R_c & \lambda_c \hat{t}_c \\ 0 & 1 \end{bmatrix} \begin{bmatrix} R_x & t_x \\ 0 & 1 \end{bmatrix} = \begin{bmatrix} R_x & t_x \\ 0 & 1 \end{bmatrix} \begin{bmatrix} R_d & t_d \\ 0 & 1 \end{bmatrix} \quad \text{[Equation 7]}$$

When calculating a matrix equation of Equation 7, Equation 8 and Equation 9 may be given.

$$R_c R_x = R_x R_d \quad \text{[Equation 8]}$$

$$R_c t_x + \lambda_c \hat{t}_c = R_x t_d + t_x \quad \text{[Equation 9]}$$

As described above, $R_c$ and $R_d$ correspond to the known values and thus, the third calculator 130 may immediately calculate $R_x$ using Equation 8. However, since unknown values $\lambda_c$ and $t_x$ are present in Equation 9, the third calculator 130 may not immediately calculate $R_x$.

According to example embodiments, using color images and depth images of three frames, Equation 10 through Equation 13 may be obtained.

$$R_{c1} R_x = R_x R_{d1} \quad \text{[Equation 10]}$$

$$R_{c2} R_x = R_x R_{d2} \quad \text{[Equation 11]}$$

$$R_{c1} t_x + \lambda_{c1} \hat{t}_{c1} = R_x t_{d1} + t_x \quad \text{[Equation 12]}$$

$$R_{c2} t_x + \lambda_{c2} \hat{t}_{c2} = R_x t_{d2} + t_x \quad \text{[Equation 13]}$$

Equation 12 and Equation 13 may be expressed again by Equation 14 and Equation 15.

$$(R_{c1} - I) t_x + \lambda_{c1} \hat{t}_{c1} = R_x t_{d1} \quad \text{[Equation 14]}$$

$$(R_{c2} - I) t_x + \lambda_{c2} \hat{t}_{c2} = R_x t_{d2} \quad \text{[Equation 15]}$$

Accordingly, the third calculator 130 may calculate all the unknown values using a linear equation problem of Equation 10 through Equation 15.

Figure 3:
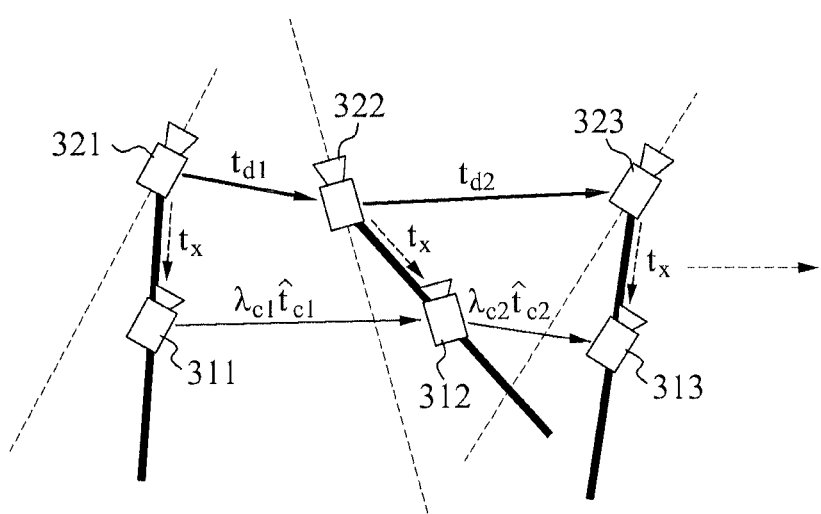
FIG. 3 illustrates a diagram to describe a view transform vector between frames in an image processing method according to example embodiments.

In the case of at least three frames, four frames, five frames, and the like may be used. FIG. 3 illustrates a diagram to describe a view transform vector between frames in an image processing method according to example embodiments.

In FIG. 3, a color camera position 311 and a depth camera position 321 in a first frame are shown. A view translation vector $t_x$ between the color camera position 311 and the depth camera position 312 is indicated.

Similarly, a color camera position 312 and a depth camera position 322 in a second frame and a color camera position 313 and a depth camera position 323 in a third frame have the aforementioned relationship. In this example, it is assumed that the view translation vector $t_x$ does not vary.

In FIG. 3, view translations or view rotations are indicated in detail and a calculation process thereof is described above with reference to FIG. 2.

Figure 4:
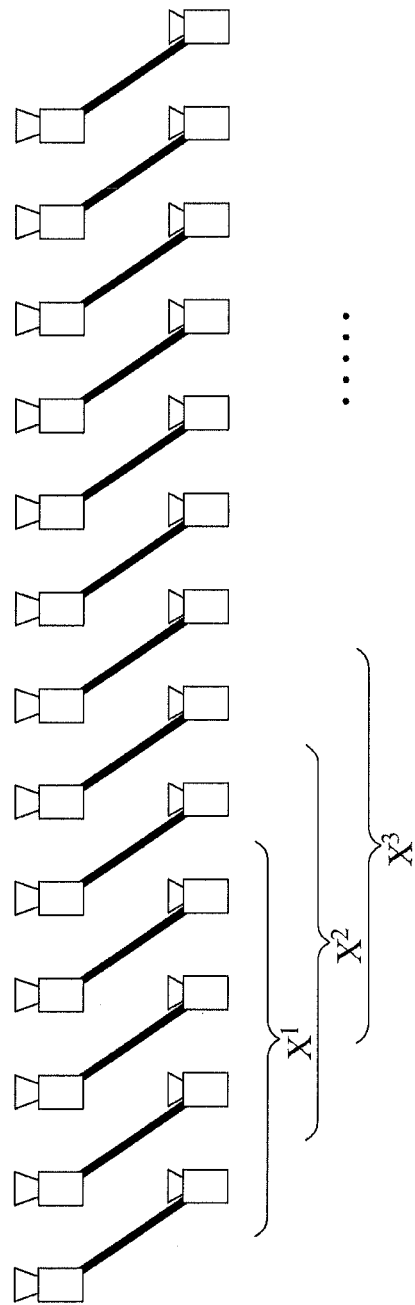
FIG. 4 illustrates a diagram to describe a process of continuously calculating, by the image processing apparatus of FIG. 1, a view transform vector using color images and depth images of frames according to example embodiments.

FIG. 4 illustrates a diagram to describe a process of continuously calculating, by the image processing apparatus 100 of FIG. 1, a view transform vector using color images and depth images of frames according to example embodiments.

The image processing apparatus 100 may calculate view transform vector using color images and depth images of a total of four frames including a current target frame and previous three frames of the current target frame.

Referring to FIG. 4, a view transform vector $X^j$ calculated in a $j^{th}$ frame may be expressed by Equation 16.

$$X^j = \begin{bmatrix} R_x^j & t_x^j \\ 0 & 1 \end{bmatrix}$$ [Equation 16]

In this example, the view transform vector may be expressed by Equation 17.

$$X = \frac{\sum_{j=T-\alpha}^{T} \beta^{T-j} \cdot X^j}{\sum_{j=T-\alpha}^{T} \beta^{T-j}}$$ [Equation 17]

In Equation 17, T corresponds to a time index of a current frame, α corresponds to an average window size, and β corresponds to a confidence of each estimation transformation.

When the view transform vector is calculated using n frames for the linear equation during the above calculation process, Equation 14 and Equation 15 may be expressed by Equation 18.

$$(R_{cN}-I)t_x+\lambda_{cN}\hat{t}_{cN}=R_x t_{dN}$$ [Equation 18]

Figure 5:
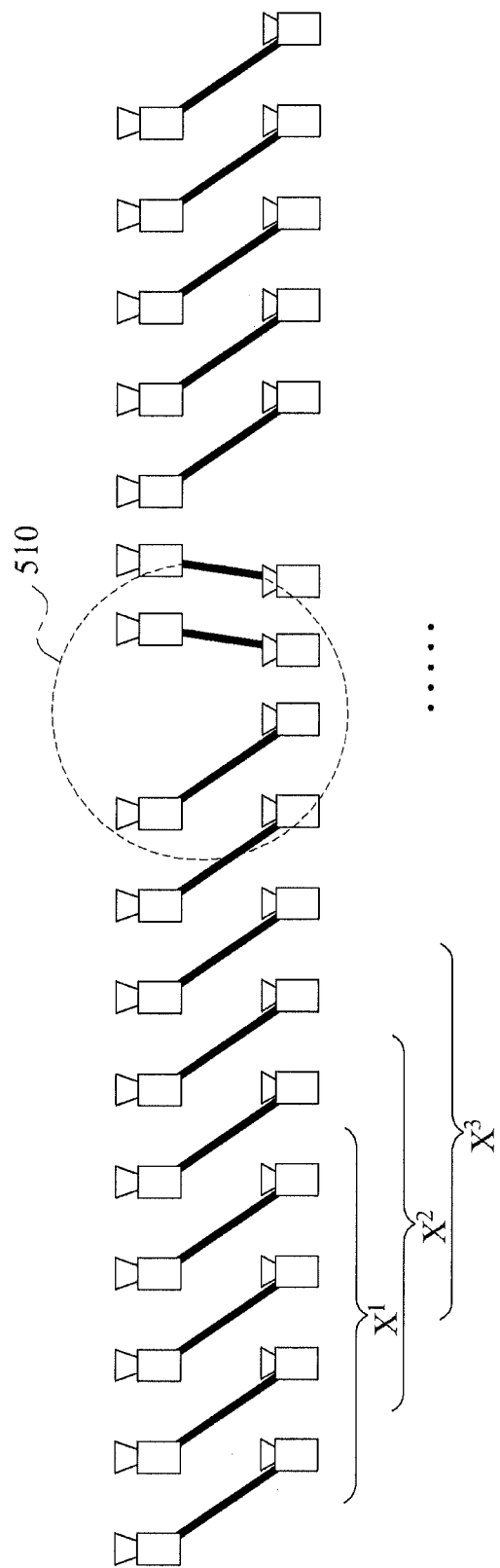
FIG. 5 illustrates a diagram to describe a process of processing, by the image processing apparatus of FIG. 1, a relative view translation difference or a relative view rotation difference between a color camera and a depth camera in different frames according to example embodiments.

FIG. 5 illustrates a diagram to describe a process of processing, by the image processing apparatus 100, a relative view translation difference or a relative view rotation difference between a color camera and a depth camera in different frames according to example embodiments.

Even though it is assumed that a view transform vector X between the color camera and the depth camera does not vary in the above example embodiments, a relative translation difference or a view rotation difference between the color camera and the depth camera in frames may vary.

A portion 510 of FIG. 5 in a frame corresponds to the above portion.

The view transform vector X may be calculated using color images and depth images for each frame. In such portion where the difference occurs, when a plurality of frames are passed, the accurate view transform vector X may be calculated.

During the above process, the view transform vector X calculated for each frame may be statistically stored and be used for calculating the view transform vector X to be calculated in a subsequent frame.

When the view transform vector X suddenly changes, the change may occur due to a camera drift where the relative translation or rotation changes between the color camera and the depth camera, however, may occur due to an error in a calculation process of the view transform vector C or the view transform vector D of the first calculator 110 or the second calculator 120.

Figure 6:
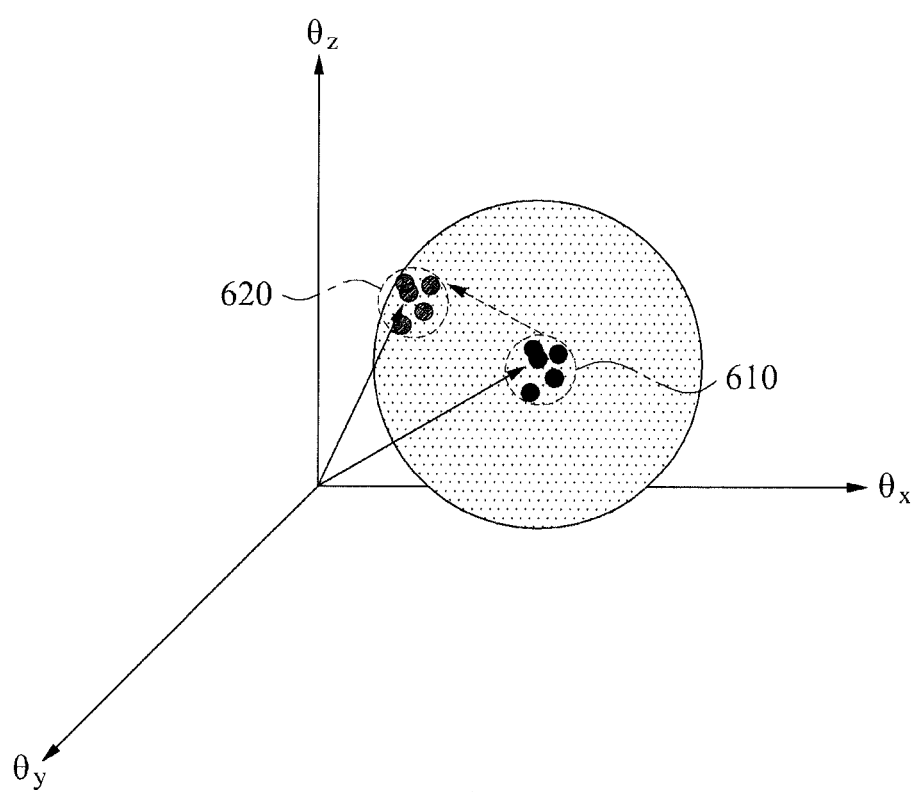
FIG. 6 illustrates a diagram to describe a process of using, by the image processing apparatus of FIG. 1, statistics of view transform vectors calculated in previous frames for calculating of a view transform vector of a current frame according to example embodiments.
Figure 7:
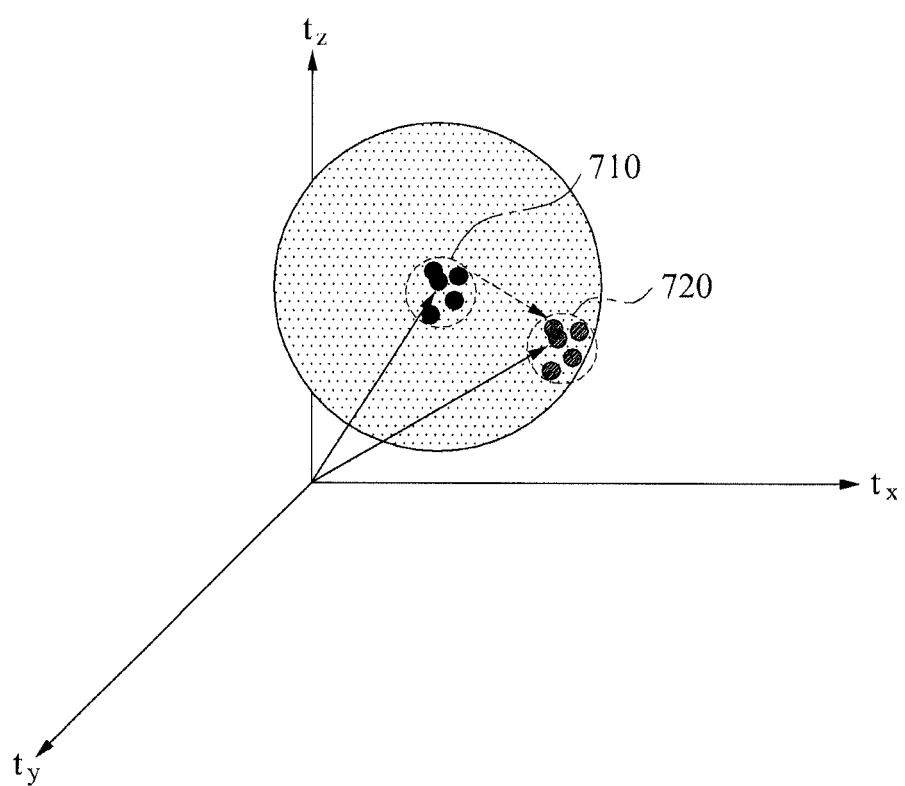
FIG. 7 illustrates a diagram to describe a process of using, by the image processing apparatus of FIG. 1, statistics of view transform vectors calculated in previous frames for calculating of a view transform vector of a current frame according to other example embodiments.

FIG. 6 and FIG. 7 illustrate the above examples.

FIG. 6 illustrates a diagram to describe a process of using, by the image processing apparatus 100 of FIG. 1, statistics of view transform vectors calculated in previous frames for calculating of a view transform vector of a current frame according to example embodiments.

FIG. 6 illustrates a process of statistically storing a calculation of a view rotation vector. In predetermined frames, view rotation vectors $R_x$ have been distributed in a region 610, however, changed to be distributed in a region 620 due to a camera drift and the like.

The above statistically stored information is used for Equation 17, and confidence of each estimation transformation β may be understood as a weight that weighs the statistical information and uses the weighed statistical information for the view rotation vector $R_x$ of the current frame.

FIG. 7 illustrates a diagram to describe a process of using, by the image processing apparatus 100 of FIG. 1, statistics of view transform vectors calculated in previous frames for calculating of a view transform vector of a current frame according to other example embodiments.

A graph of FIG. 7 corresponds to a view rotation vector $t_x$ and detailed description related thereto will be the same as described above with reference to FIG. 6.

Figure 8:
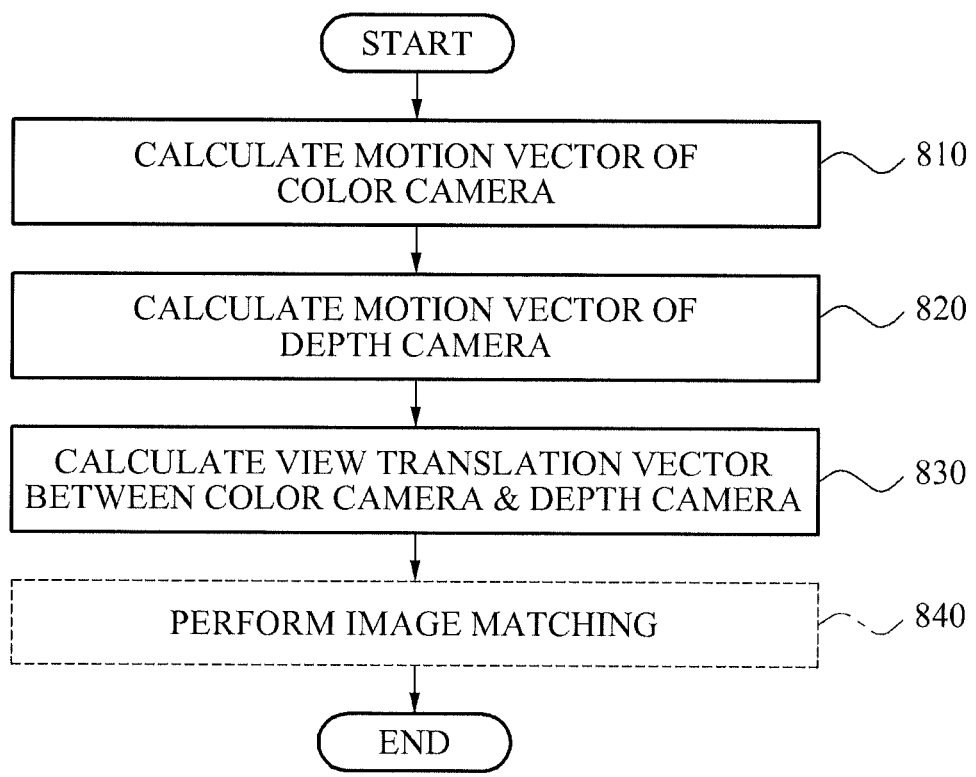
FIG. 8 illustrates an image processing method according to example embodiments.

FIG. 8 illustrates an image processing method according to example embodiments.

In operation 810, the first calculator 110 of the image processing apparatus 100 may extract a plurality of feature points from each of a color image of a first frame and a color image of a second frame.

The first calculator 110 may select, from a plurality of feature points extracted from the second frame, corresponding points with respect to at least one portion of a plurality of feature points extracted from the first frame.

In this example, the first calculator 110 may calculate a view transform vector C between a color camera view in the first frame and a color camera view in the second frame using a displacement between the selected corresponding points.

A calculation process of the view transform vector C, which is also referred to as a motion vector, of the color camera is described above with reference to FIG. 1 and Equation 1, and the like.

In operation 820, the second calculator 120 may extract a plurality of feature points from each of a depth image of the first frame and a depth image of the second frame.

The second calculator 120 may select, from a plurality of feature points extracted from the second frame, corresponding points with respect to at least one portion of a plurality of feature points extracted from the first frame.

In this example, the second calculator 120 may calculate a view transform vector D between a depth camera view in the first frame and a depth camera view in the second frame using a displacement between the selected corresponding points.

A calculation process of the view transform vector D of the depth camera is described above with reference to FIG. 1 and Equation 2, and the like.

In operation 830, the third calculator 130 may calculate a view transform vector X between the color camera and the depth camera in the first frame and/or the second frame, using the view transform vector C between the color camera view in the first frame and the color camera view in the second frame, and the view transform vector D of the depth camera between the first frame and the second frame.

A calculation process of the view transform vector X between the color camera and the depth camera is described above with reference to FIG. 1 through FIG. 7.

Operation 840 may be selectively performed.

In operation 840, 3D object information of an object may be obtained by matching the color image and the depth image using the view transform vector X between the color camera and the depth camera.

The image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

The embodiments can be implemented in computing hardware (computing apparatus, including a processor) and/or software, such as (in a non-limiting example) any computer that can store, retrieve, process and/or output data and/or communicate with other computers. The results produced can be displayed on a display of the computing hardware. A program/software implementing the embodiments may be recorded on a computer-readable media, e.g., a non-transitory or persistent computer-readable medium. The program/software implementing the embodiments may also be transmitted over a transmission communication path, e.g., a network implemented via hardware. Examples of the non-transitory or persistent computer-readable media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
   a first calculator configured to calculate a view transform vector of a color camera between a first frame and a second frame by comparing corresponding points between a color image of the first frame and a color image of the second frame;
   a second calculator configured to calculate a view transform vector of a depth camera between the first frame and the second frame by comparing corresponding points between a depth image of the first frame and a depth image of the second frame; and
   a third calculator configured to calculate a view transform vector between the color camera and the depth camera using the view transform vector of the color camera and the view transform vector of the depth camera,
   wherein the first calculator is configured to extract a plurality of feature points from each of the color image of the first frame and the color image of the second frame, determine the corresponding points between the color image of the first frame and the color image of the second frame among the extracted plurality of feature points, and calculate the view transform vector of the color camera between the first frame and the second frame using a displacement between the corresponding points, and
   wherein the second calculator is configured to extract a plurality of feature points from each of the depth image of the first frame and the depth image of the second image, determine the corresponding points between the depth image of the first frame and the depth image of the second frame among the extracted plurality of feature points, and calculate the view transform vector of the depth camera between the first frame and the second frame using a displacement between the corresponding points.

2. The image processing apparatus of claim 1, wherein the first calculator is configured to calculate the view transform vector of the color camera between the first frame and the second frame using a structure form motion (SFM) process.

3. The image processing apparatus of claim 1, wherein the second calculator is configured to calculate the view transform vector of the depth camera between the first frame and the second frame using at least one of a depth point cloud matching process and a three-dimensional (3D) feature point correspondence process.

4. The image processing apparatus of claim 1, wherein the first calculator is further configured to calculate a view transform vector of the color camera between the second frame and a third frame by comparing corresponding points between the color image of the second frame and a color image of the third frame.

5. The image processing apparatus of claim 4, wherein the second calculator is configured to calculate the view transform vector of the depth camera between the first frame and the second frame by comparing the corresponding points between the depth image of the first frame and the depth image of the second frame, and calculate a view transform vector of the depth camera between the second frame and the third frame by comparing corresponding points between the depth image of the second frame and a depth image of the third frame.

6. The image processing apparatus of claim 5, wherein the third calculator is configured to calculate the view transform vector between the color camera and the depth camera using the view transform vector of the color camera between the first frame and the second frame, the view transform vector of the color camera between the second frame and the third frame, the view transform vector of the depth camera between the first frame and the second frame, and the view transform vector of the depth camera between the second frame and the third frame.

7. The image processing apparatus of claim 1, wherein the third calculator is configured to determine an appropriateness of the calculated view transform vector between the color camera and the depth camera using statistics of previously calculated view transform vectors.

8. The image processing apparatus of claim 1, wherein the depth image of the first frame and the depth image of the second frame are acquired from the depth camera.

9. The image processing apparatus of claim 1, wherein the view transform vector between the color camera and the depth camera comprises a view translation vector and a view rotation vector.

10. An image processing method, comprising:
calculating a view transform vector of a color camera between a first frame and a second frame by comparing corresponding points between a color image of the first frame and a color image of the second frame;
calculating a view transform vector of a depth camera between the first frame and the second frame by comparing corresponding points between a depth image of the first frame and a depth image of the second frame; and
calculating a view transform vector between the color camera and the depth camera using the view transform vector of the color camera and the view transform vector of the depth camera,
wherein the calculating a view transform vector of a color camera includes,
extracting a plurality of feature points from each of the color image of the first frame and the color image of the second frame,
determining the corresponding points between the color image of the first frame and the color image of the second frame among the extracted plurality of feature points, and
calculating the view transform vector of the color camera between the first frame and the second frame using a displacement between the corresponding points, and
wherein the calculating a view transform vector of a depth camera includes,
extracting a plurality of feature points from each of the depth image of the first frame and the depth image of the second image,
determining the corresponding points between the depth image of the first frame and the depth image of the second frame among the extracted plurality of feature points, and
calculating the view transform vector of the depth camera between the first frame and the second frame using a displacement between the corresponding points.

11. The image processing method of claim 10, wherein the calculating a view transform vector of a color camera further includes
calculating a view transform vector of the color camera between the second frame and a third frame by comparing corresponding points between the color image of the second frame and a color image of the third frame.

12. The image processing method of claim 11, wherein the calculating of a view transform vector of a depth camera comprises:
calculating the view transform vector of the depth camera between the first frame and the second frame by comparing the corresponding points between the depth image of the first frame and the depth image of the second frame; and
calculating a view transform vector of the depth camera between the second frame and the third frame by comparing corresponding points between the depth image of the second frame and a depth image of the third frame.

13. The image processing method of claim 12, wherein the calculating a view transform vector between the color camera and the depth camera comprises:
calculating the view transform vector between the color camera and the depth camera using the view transform vector of the color camera between the first frame and the second frame, the view transform vector of the color camera between the second frame and the third frame, the view transform vector of the depth camera between the first frame and the second frame, and the view transform vector of the depth camera between the second frame and the third frame.

14. The image processing method of claim 10, wherein the calculating a view transform vector between the color camera and the depth camera comprises determining an appropriateness of the calculated view transform vector between the color camera and the depth camera using statistics of previously calculated view transform vectors.

15. The image processing method of claim 10, further comprising:
obtaining three-dimensional (3D) information by matching a color image of at least one of the first frame and the second frame with a depth image of at least one of the first frame and the second frame using the view transform vector between the color camera and the depth camera.

16. A non-transitory computer-readable medium comprising a program for instructing a computer to perform the method of claim 10.

17. An apparatus, comprising:
a color camera configured to acquire a color image of a first frame and a color image of a second frame;
a depth camera configured to acquire a depth image of the first frame and a depth image of the second frame; and
a processor configured to determine a calibration between the color camera and the depth camera by comparing corresponding points between the color image of the first frame and the color image of the second frame and comparing corresponding points between the depth image of the first frame and the depth image of the second frame,
wherein the processor is configured to,
extract a plurality of feature points from each of the color image of the first frame and the color image of the second frame,
determine the corresponding points between the color image of the first frame and the color image of the second frame among the extracted plurality of feature points,
calculate a view transform vector of the color camera between the first frame and the second frame by comparing the corresponding points between the color image of the first frame and the color image of the second frame and using a displacement between the corresponding points,
extract a plurality of feature points from each of the depth image of the first frame and the depth image of the second image, determine the corresponding points between the depth image of the first frame and the depth image of the second frame among the extracted plurality of feature points, calculate the view transform vector of the depth camera between the first frame and the second frame by comparing the corresponding points between the depth image of the first frame and the depth image of the second frame and using a displacement between the corresponding points, and calculate a view transform vector between the color camera and the depth camera using the view transform vector of the color camera and the view transform vector of the depth camera.

18. The apparatus of claim 17, wherein the processor is configured to determine the calibration by determining a view transform vector between the color camera and the depth camera.

19. The apparatus of claim 18, wherein the processor is configured to determine the view transform vector between the color camera and the depth camera by determining a view transform vector of the color camera and a view transform vector of the depth camera.

20. A method, comprising:

acquiring, by a color camera, a color image of a first frame and a color image of a second frame;

extracting, by a processor, a plurality of feature points from each of the color image of the first frame and the color image of the second frame;

determining, by the processor, first corresponding points between the color image of the first frame and the color image of the second frame among the extracted plurality of feature points;

acquiring, by a depth camera, a depth image of the first frame and a depth image of the second frame;

extracting, by the processor, a plurality of feature points from each of the depth image of the first frame and the depth image of the second image;

determining, by the processor, second corresponding points between the depth image of the first frame and the depth image of the second frame among the extracted plurality of feature points; and comparing, by the processor, the first corresponding points between the color image of the first frame and the color image of the second frame, and calculating, by the processor, a view transform vector of the color camera between the first frame and the second frame using a displacement between the first corresponding points, comparing, by the processor, the second corresponding points between the depth image of the first frame and the depth image of the second frame, calculating, by the processor, a view transform vector of the depth camera between the first frame and the second frame using a displacement between the second corresponding points, and determining, by the processor, a calibration between the color camera and the depth camera, the determining a calibration including calculating a view transform vector between the color camera and the depth camera using the view transform vector of the color camera and the view transform vector of the depth camera.

* * * * *